US012737384B2

(12) United States Patent
Fritzsche et al.

(10) Patent No.: US 12,737,384 B2
(45) Date of Patent: Sep. 15, 2026

(54) EMBEDDING-BASED FAULT RESOLUTION

(71) Applicant: SAP SE, Walldorf (DE)

(72) Inventors: Christoph Fritzsche, Speyer (DE); Michael Philipp, Wiesloch (DE); Fabienne Spaethe, Ittlingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/950,675

(22) Filed: Nov. 18, 2024

(65) Prior Publication Data

US 2026/0140967 A1 May 21, 2026

(51) Int. Cl.
*G06F 16/28* (2019.01)
*G06F 16/2455* (2019.01)

(52) U.S. Cl.
CPC ........ *G06F 16/284* (2019.01); *G06F 16/2455* (2019.01)

(58) Field of Classification Search
CPC .......................... G06F 16/284; G06F 16/2455
USPC ........................................................ 707/802
See application file for complete search history.

(56) References Cited

U.S. PATENT DOCUMENTS 6,650,779 B2 * 11/2003 Vachtesvanos ........ G06V 10/52 382/218
9,400,490 B2 * 7/2016 Turolla .................... G05B 9/02
9,818,242 B2 * 11/2017 Volponi ................. G06N 5/047
10,331,817 B1 * 6/2019 Tertois ................... G01V 20/00
11,704,318 B1 * 7/2023 Keivanloo ............ G06F 16/248 707/769
12,055,998 B2 * 8/2024 Settle .................. G06F 11/3447
12,242,496 B2 * 3/2025 Kroll ................... G06F 16/2455
12,299,397 B2 * 5/2025 Turkkan .................. G06F 40/30
12,443,635 B1 * 10/2025 Wolff .................... G06F 16/334
2003/0225466 A1 * 12/2003 Yulevitch ............. G05B 23/024 700/79
2004/0039499 A1 * 2/2004 Felke .................... G06F 16/284 701/29.3
2005/0114743 A1 * 5/2005 Moorhouse ............. H04L 41/06 714/100
2008/0010531 A1 * 1/2008 Hendler ............. G05B 23/0281 714/33
2008/0307269 A1 * 12/2008 Bennett ................. G06F 11/079 714/E11.144
2012/0101622 A1 * 4/2012 Yun ..................... H01J 37/3299 700/110
2013/0144866 A1 * 6/2013 Jerzak ................ G06F 11/2035 707/718
2015/0219530 A1 * 8/2015 Li ........................... G06F 17/18 702/181

(Continued)

*Primary Examiner* — Hanh B Thai
(74) *Attorney, Agent, or Firm* — Buckley, Maschoff & Talwalkar LLC

(57) ABSTRACT

A system and method include identification of a future fault period and a future fault amount associated with a component, determination of production characteristics of the component, generation of a multi-dimensional vector representing the future fault period, the future fault amount and the production characteristics, searching of a vector database of multi-dimensional vectors to identify a second multi-dimensional vector similar to the first multi-dimensional vector and first actions corresponding to the second multi-dimensional vector, and automatic execution of the first actions to resolve the future fault period and the future fault amount associated with the component.

17 Claims, 10 Drawing Sheets

(56) References Cited

U.S. PATENT DOCUMENTS

| | | | | |
|---|---|---|---|---|
| 2017/0075946 | A1* | 3/2017 | Bossa | G06F 16/2471 |
| 2019/0171622 | A1* | 6/2019 | Zong | G06F 16/24542 |
| 2019/0171644 | A1* | 6/2019 | Xu | G06F 11/08 |
| 2019/0392533 | A1* | 12/2019 | Thurner | G06Q 10/06395 |
| 2020/0233391 | A1* | 7/2020 | Ma | G08G 1/142 |
| 2020/0272923 | A1* | 8/2020 | Banerjee | H04L 41/142 |
| 2021/0303381 | A1* | 9/2021 | Baldassarre | G06N 5/04 |
| 2023/0160942 | A1* | 5/2023 | Liu | G06N 3/0464<br>702/58 |
| 2023/0316711 | A1* | 10/2023 | Unuma | E02F 9/264<br>382/224 |
| 2024/0078444 | A1* | 3/2024 | Fang | G06N 3/044 |
| 2025/0004431 | A1* | 1/2025 | Wang | G05B 13/0275 |
| 2025/0355748 | A1* | 11/2025 | Wang | G06F 11/0781 |

* cited by examiner

300

Shortage Projections

Materials

310

320

| Material Number | Material Description | Shortage Quantity | Stock Availability | |
|---|---|---|---|---|
| RM 1420 | Standard_Bike_Blue | 1 PC | | Actions |
| RM 0503 | Lubricant | 55.8 L | | Actions |
| RM 0504 | Alloy Rims | 76 PC | | Actions |
| RM 0511 | Pedal, child, blue | 11 PC | | Actions |

| Case ID | KeyFigure | Today+ 0 | Today+ 1 | Today+ 2 | Today+ 3 | Today+ 4 | Today+ 5 | Today+ 6 | Today+ 7 | Today+ 8 | Today+ 9 |
|---|---|---|---|---|---|---|---|---|---|---|---|
| 52 | Forecast | 3 | 1 | 1 | 1 | 1 | 1 | 1 | 3 | 1 | 1 |
| 52 | Sales | 0 | 0 | 3 | 0 | 1 | 2 | 0 | 0 | 2 | 0 |
| 52 | Buy | 0 | 0 | 0 | 0 | 0 | 0 | 0 | 0 | 0 | 0 |
| 52 | Make | 3 | 1 | 4 | 1 | 2 | 3 | 1 | 3 | 4 | 0 |
| 52 | Stock | 0 | 0 | 0 | 0 | 0 | 0 | 0 | 0 | 1 | 0 |

| Case ID | Material | Issue Type | Issue Period |
|---|---|---|---|
| 52 | Standard_Bike_Blue | Too early supply by 1 period | Today+8 |

| Material | Lead Time | Supply Method | Lot Size | Classification |
|---|---|---|---|---|
| Standard_Bike_Blue | 0 | Make | 1 | Stock Forbidden |

*FIG. 4C*

| Case ID | Material | Issue Type | Issue Period | Solution | Solution Period | Solution Size |
|---|---|---|---|---|---|---|
| 11 | Premium_Bike_Blue | Too early supply by 1 period | Today+8 | Push Supply back by 1 period | Today+8 | 4 |

EMBEDDING-BASED FAULT RESOLUTION

BACKGROUND

Modern enterprises generate and store vast amounts of data. Software applications allow users to review, manage and analyze the stored data in order to assist enterprise processes. For example, an application may identify a potential future fault in an enterprise process and alert a user to the fault. The application may also provide functions which allow the user to address the fault, such as functions for re-allocating resources. Oftentimes, a user operates one or more other applications (i.e., applications other than the application which identified the fault) to address the fault.

A supply chain application, for example, may alert users to hundreds of faults (e.g., component shortages) daily. The number of possible approaches to address such faults may be quite large. Determining the ideal approach for all potential faults requires substantial expertise. Moreover, applying the approaches may involve an unwieldy number of steps and disparate applications.

Existing systems attempt to propose approaches to address identified potential faults based on past faults and their solutions. However, the number of possible types of faults is often vast, as are the number of dimensions per identified fault. Consequently, it is quite difficult to identify a past fault which corresponds to a presently-identified fault. What is needed are systems to efficiently resolve process faults based at least in part on past faults and their respective solutions.

BRIEF DESCRIPTION OF THE DRAWINGS

FIG. 3 is a user interface presenting identified potential faults according to some embodiments.

FIG. 4A is a tabular representation of a portion of a database table according to some embodiments.

FIG. 4B is a tabular representation of a portion of a fault record according to some embodiments.

FIG. 4C is a tabular representation of a portion of a component record according to some embodiments.

DETAILED DESCRIPTION

The following description is provided to enable any person in the art to make and use the described embodiments. Various modifications, however, will be readily-apparent to those in the art.

Embodiments provide a useful improvement to the resolution of faults within an enterprise computing system. According to some examples, dimension values representing a fault and actions taken to resolve the fault are recorded in a database. The dimension values are associated with a vector representation of the dimension values of the fault. Upon detection of a new fault, a new vector representation of the dimension values of the new fault is generated. The database is searched to identify a similar vector representation and associated action. The actions may then be presented to an administrator to assist in addressing the new fault.

In some embodiments, the actions may be automatically executed. Automatic execution of the actions may depend on a degree of similarity between the new vector representation and the identified stored vector representation, and/or on a degree of confidence of the resolution with respect to the stored fault. According to some embodiments, the administrator modifies the presented actions to resolve the new fault and, in response, the new fault and the modified actions are recorded in the vector database for future use.

Embodiments may therefore provide more efficient and accurate detection and resolution of faults within a computing system. By virtue of this increased efficiency and accuracy, embodiments advantageously reduce an amount of computing resources required to detect and resolve such faults.

Embodiments may also facilitate the implementation of case-based reasoning. The case-based reasoning of some embodiments may propose solutions based on a much smaller set of prior cases than required by supervised-learning approaches. Moreover, the proposed solutions are more explainable than those output by a trained supervised-learning model.

Figure 1:
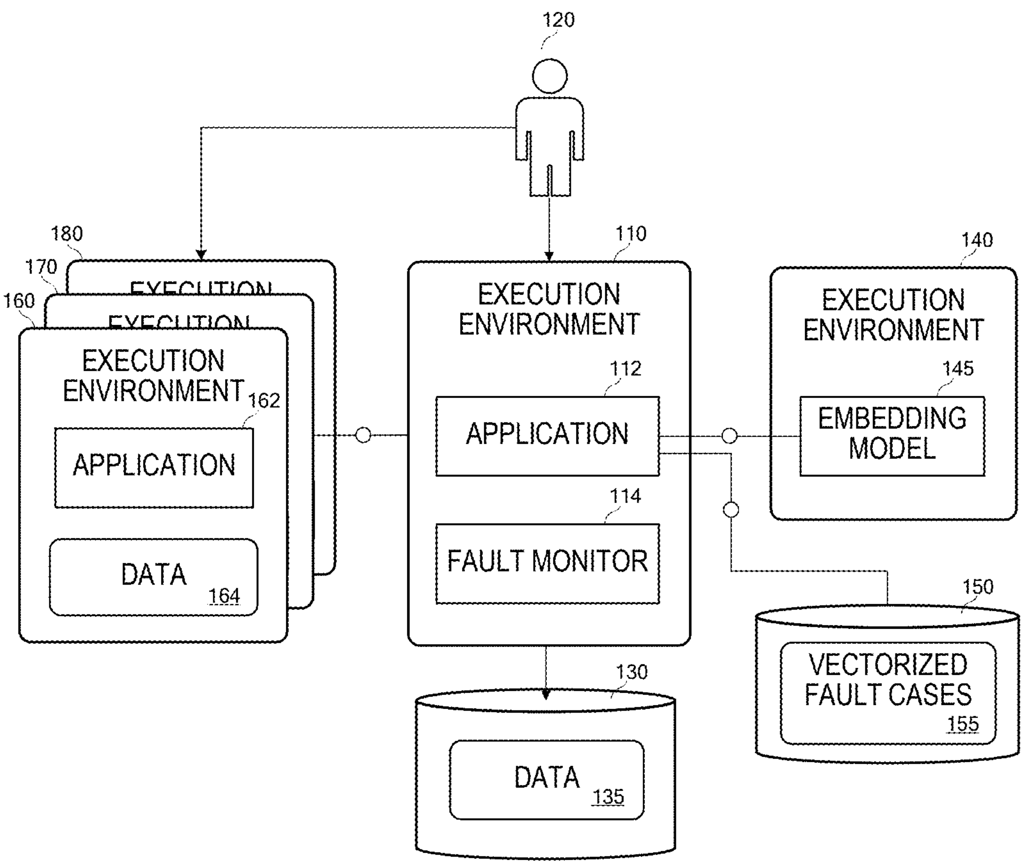
FIG. 1 illustrates a system to identify and resolve potential faults within an enterprise system according to some embodiments.

FIG. 1 illustrates an architecture to identify and resolve potential faults within an enterprise system according to some embodiments. Each of the illustrated components may be implemented using any suitable combination of local, on-premise, cloud-based, distributed (e.g., including distributed storage and/or compute nodes) computing hardware and/or software that is or becomes known. Each component described herein may be executed by one or more physical and/or virtualized servers.

Two or more components of FIG. 1 may be co-located. In some embodiments, two or more components are implemented by a single computing device. One or more components may be implemented by a cloud service (e.g., Software-as-a-Service, Platform-as-a-Service). A cloud-based implementation of any components of FIG. 1 may apportion computing resources elastically according to demand, need, price, and/or any other metric. Each of execution environments 110 140, 160, 170 and 180 may comprise one or more servers, virtual machines, clusters of a container orchestration system, etc. The execution environments may provide an operating system, services, I/O, storage, libraries, frameworks, etc. to applications executing therein.

Application 112 and fault monitor 114 may comprise program code executable by execution environment 110 to operate as described herein. Application 112 may provide any set of functions desired by an enterprise. In some embodiments, application 112 is a supply chain management application. Similarly, fault monitor 114 may comprise any application to prospectively identify potential faults within processes managed by application 112. Fault monitor 114 and application 112 may comprise components of the same application in some embodiments.

Application 112 and fault monitor 114 may instruct storage system 130 to create, read, update and delete records of data 135. System 130 may comprise any type of database, data warehouse, object store, or other storage system that is or becomes known. Storage system 130 may be implemented using one or more storage systems, each of which may be standalone or distributed, on-premise or cloud-based. Storage system 130 may comprise a database management system (not shown) for communication therewith and management thereof as is known in the art.

Data 135 may comprise tabular data stored in a columnar or row-based format, object data or any other type of data that is or becomes known. Data 135 may also include metadata which describes the structure and interrelationships (i.e., the schema) of the data. Data 135 may include tables which are associated with respective entities and related to one another via foreign keys as is known in the art. For example, the metadata may define a table associated with an entity (e.g., product) and columns respectively associated with dimensions (e.g., price, lead time, weight) of that entity. Each row of the table is associated with a particular instance of the entity (i.e., a particular product) and includes values of each dimension (e.g., $ 10.99, 2 days, 15 lbs.) for that particular instance.

Some embodiments define a set of dimensions representing a fault. These dimensions may be stored within a table associated with a fault entity, in which every row of the table includes dimension values of a corresponding fault (i.e., an instance of the fault entity). In one example, a fault may consist of an expected future shortage of a material and may be defined by dimensions such as but not limited to Material, Issue Type, and Issue Period.

User 120 may operate a user device (not shown) to access and interact with application 112. The user device may comprise, for example, a laptop computer, a desktop computer, a smartphone, or a tablet computer. Application 112 may operate to present user 120 with user interfaces indicating a potential future fault and actions which may be performed to address the fault. The potential future fault may be identified by fault monitor 114.

In order to determine the actions which may be performed to address the fault, application 112 may transmit a prompt to embedding model 145 and, in return, receive a multi-dimensional vector representing the fault. Application 112 may generate the prompt using a prompt template and dimension values which represent the fault.

Embedding model 145 executes within execution environment 140 and is pre-trained to generate a multi-dimensional numerical vector (i.e., an embedding) which is intended to capture the semantic and syntactic meaning of input text. Embedding model 145 may be implemented by executable program code, a set of hyperparameters defining a model structure and a set of corresponding weights, or any other representation of an input-to-output mapping.

Application 112 uses the multi-dimensional vector to search vectorized fault cases 155 of storage system 150. Vectorized fault cases 155 include multi-dimensional vectors representing previously-identified faults, each of which is associated with data specifying a solution, i.e., a set of actions which were previously performed to address the faults. Application 112 identifies one or more multi-dimensional vectors of cases 155 which are similar to the vector received from model 145 and retrieves the solution data associated with each of the identified cases.

The actions of the solution may include operations to be performed by application 112 and/or by one or more applications executing within execution environments 160, 170 and 180. For example, the actions may include accessing production application 162 to revise a production schedule. Revising the production schedule may result in the updating of corresponding data of data 164.

According to some embodiments, application 112 presents the data specifying the solution to user 120. User 120 operates one or more applications to execute the actions of the solution. In some embodiments, some or all of the actions are automatically performed and/or initiated by application 112, without intervention by user 120. The actions may be automatically performed only if, in some embodiments, the similarity of the stored vector to the generated vector is above a first threshold, and a confidence level of the solution with respect to the stored vector is above a second threshold.

Figure 2:
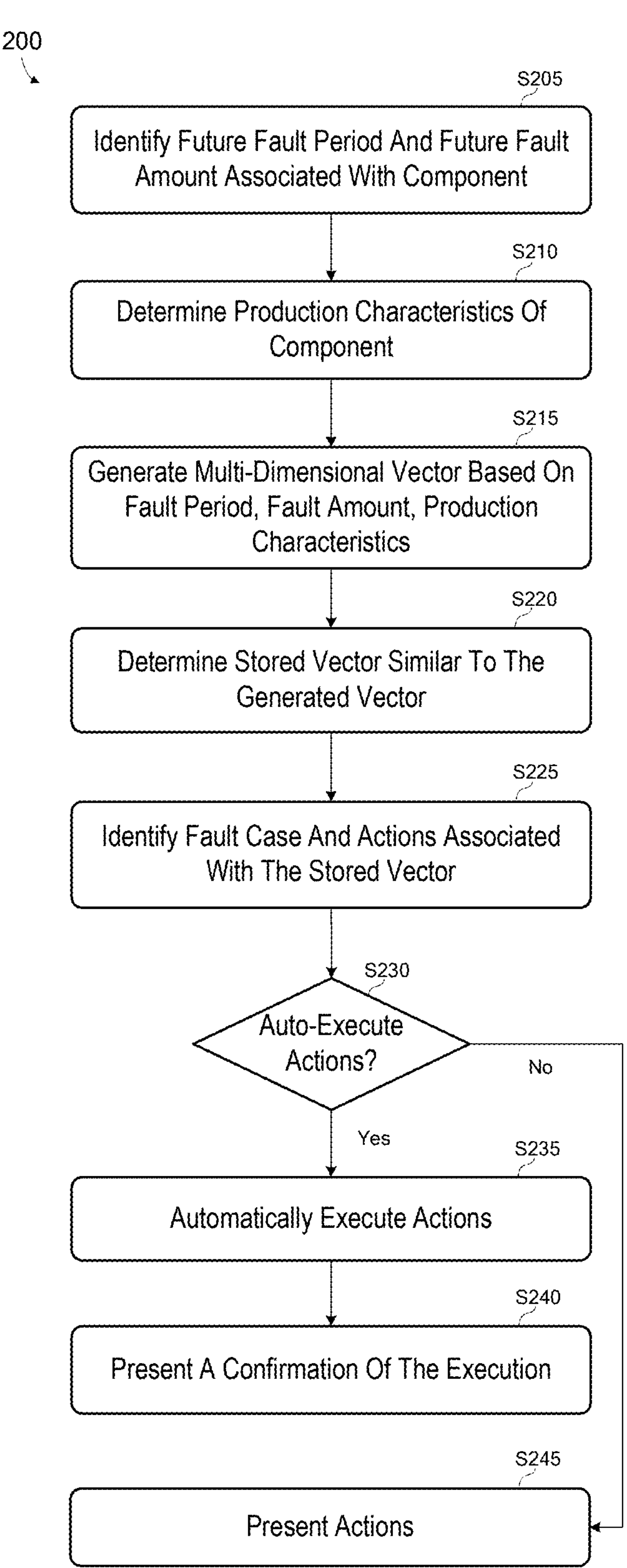
FIG. 2 is a flow diagram of a process to identify and resolve potential faults within an enterprise system according to some embodiments.

FIG. 2 comprises a flow diagram of process 200 to identify and resolve potential faults within an enterprise system according to some embodiments. Process 200 and the other processes described herein may be performed using any suitable combination of hardware and software. Software program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S205, a future fault is identified. According to some embodiments, the future fault is associated with a component, a future fault period and a future fault amount. The component may comprise any item used by the enterprise that is or becomes known, including but not limited to a raw material, finished material, product, and software code. The future fault period indicates a time at which the fault is expected to occur, and the future fault amount indicates a degree of the fault (e.g., a number of components which will be needed but will not be available at the future fault period).

Fault monitor 114 identifies the fault at S205 according to some embodiments. The fault may be identified using any suitable algorithms, including those which are currently employed by supply chain management systems. Identification of the fault may include comparison of projected conditions against a set of projected requirements.

FIG. 3 shows user interface 300 presenting identified potential faults according to some embodiments. User interface 300 may be presented by a client-side application corresponding to application 112 and executing in a Web browser of a user device. Embodiments are not limited thereto.

In the present example, user interface 300 presents faults consisting of projected shortages of various materials (i.e., components). Each of bars 310 under Stock Availability represents a day of the week, with the solid bars representing days (i.e., future fault periods) on which shortages are expected.

FIG. 4A is a tabular representation of a portion of database table 410 of data 135 according to some embodiments. Database table 410 provides time-series data for each of several KeyFigures associated with material RM 1420. The shortage identified by bars 310 associated with material RM 1420 is represented in the last row and column Today +8 of table 410.

The identified shortage (i.e., fault) may be recorded in a fault table, for example as fault record 420 of FIG. 4B. Fault record 420 includes values for dimensions Material (i.e., component), Issue Type (including the fault amount of 1) and Issue Period (i.e., Fault period). Fault record 420 may include more and different dimensions than those illustrated.

Each of Actions controls 320 of interface 300 is selectable to generate actions for addressing the corresponding shortage. For example, in response to selection of Action control 320 corresponding to material RM 1420, process 200 proceeds to S210. At S210, production characteristics of the component associated with the identified fault are determined. In the case of a shortage-type fault, production characteristics may indicate lead times for producing and stocking a component, a lot size, and a stocking classification. FIG. 4C is a tabular representation of component record 430 including production characteristics of material RM 1420 according to some embodiments. Embodiments are not limited to the production characteristics of FIG. 4C, particularly in the case of other types of faults. In some embodiments, and for certain types of identified faults, S210 is omitted from process 200.

At S215, a multi-dimensional vector is generated based on the fault period, the fault amount, and the production characteristics. Generation of the multi-dimensional vector may comprise generation of a prompt intended to describe the fault. The prompt may include the fault period, the fault amount, and the production characteristics. According to some embodiments, the prompt is generated based on a prompt template such as but not limited to the following, formatted as a system prompt:

"The issue type is <Issue Type> and the Period during which the issue occurs is <Issue Period>, the Material that has the issue is <Material> having the Attributes: Material Lead Time: <Lead Time>, Material Lot size: <Lot Size>, Material Supply Method: <Supply Method>, Stock: <Classification>. In the day before the Issue Period we have a Forecast of <KeyFigure.Forecast, (Issue Period−1)>, Sales of <KeyFigure.Sales, (Issue Period−1)>, Buy of <KeyFigure.Buy, (Issue Period-1)>, Make of <KeyFigure.Make, (Issue Period−1)>, Stock of <KeyFigure.Stock, (Issue Period−1)>. In the day of the Issue Period we have a Forecast of <KeyFigure.Forecast, (Issue Period)>, Sales of <KeyFigure.Sales, (Issue Period)>, Buy of <KeyFigure.Buy, (Issue Period)>, Make of <KeyFigure.Make, (Issue Period)>, Stock of <KeyFigure.Stock, (Issue Period)>. In the day after the Issue we have a Forecast of <KeyFigure.Forecast, (Issue Period +1)>, Sales of <KeyFigure.Forecast, (Issue Period +1)>, Buy of <KeyFigure.Buy, (Issue Period +1)>, Make of <KeyFigure.Make, (Issue Period +1)>, Stock of <KeyFigure.Stock, (Issue Period +1)>."

In view of the above prompt template, table 410 and records 420 and 430, the following prompt may be generated at S215:

"The issue type is Too early supply by 1 period and the Period during which the issue occurs is Today+8, the Material that has the issue is Standard_Bike_Blue having the Attributes: Material Lead Time: 0, Material Lot size: 1, Material Supply Method: Make, Stock: Forbidden. In the day before the Issue Period we have a Forecast of 3, Sales of 0, Buy of 0, Make of 3, Stock of 0. In the day of the Issue Period we have a Forecast of 1, Sales of 2, Buy of 0, Make of 4, Stock of 1. In the day after the Issue we have a Forecast of 1, Sales of 0, Buy of 0, Make of 0, Stock of 0."

The prompt is transmitted to an embedding model and a multi-dimensional vector is generated and returned. Next, a stored vector similar to the generated vector is determined at S220. S220 may comprise searching a vector database of multi-dimensional vectors based on the generated vector. Any suitable measure of similarity may be used to identify a most-similar vector of the vector database, including but not limited to cosine similarity. S220 may comprise transmission of a suitable query language statement to the vector database requesting the most-similar stored vector.

A fault case and actions associated with the stored vector are identified at S225. For example, the stored vector may be stored in association with dimension values of a fault case and actions of a solution to the fault case, and/or identifiers thereto. As will be described below, the dimension values may be values of the same dimensions used in record 420, and the actions may also be represented by dimension values of a stored record.

Figure 5:
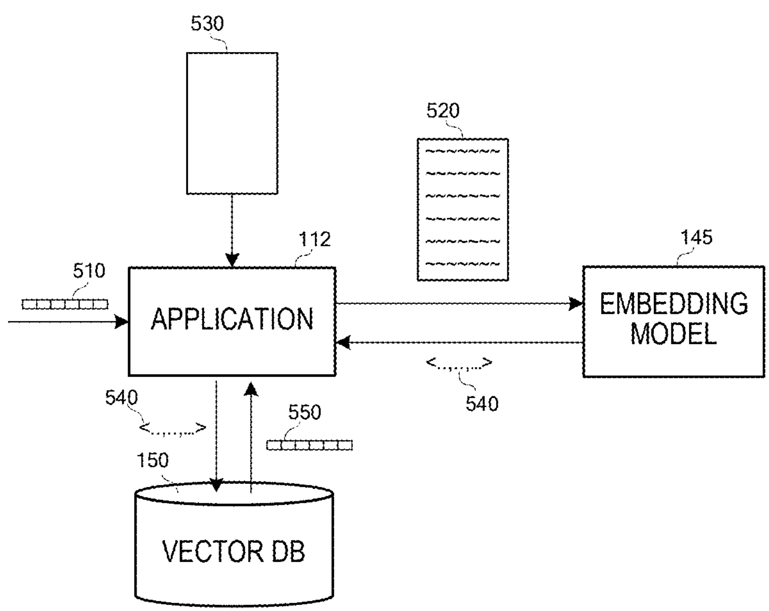
FIG. 5 illustrates prompting of an embedding model and searching a vector database according to some embodiments.

FIG. 5 illustrates prompting of an embedding model and searching a vector database to identify a fault case and actions according to some embodiments. As described above, application 112 receives dimension values 510 describing a fault and generates prompt 520 based on prompt template 530 and dimension values 510. Application 112 submits prompt 520 to embedding model 145 using known protocols and receives embedding 540 in return.

Figure 6:
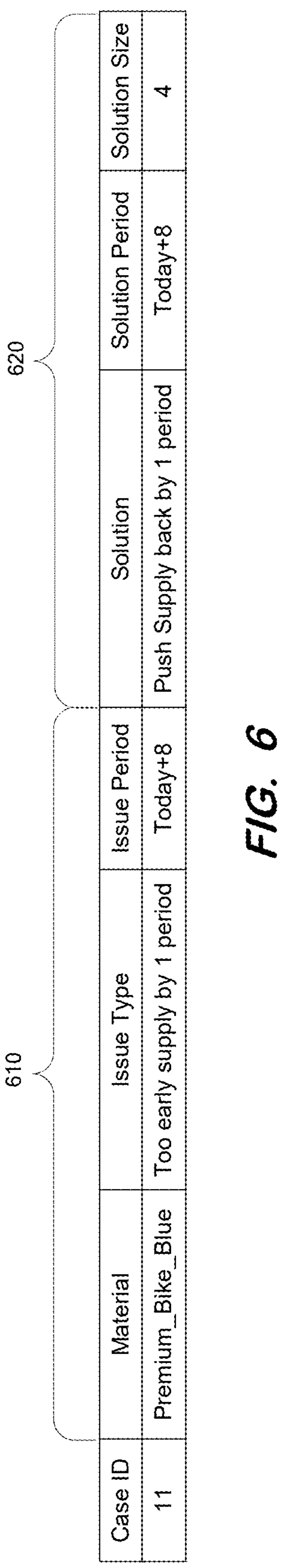
FIG. 6 is a tabular representation of a portion of a record representing a fault and actions according to some embodiments.

Application 112 searches vector database 150 based on embedding 540. Vector database 150 returns dimension values 550 associated with a most-similar vector stored in database 150. Dimension values 550 describe a historical fault and actions which were taken to resolve or otherwise address the fault. FIG. 6 is a tabular representation of a portion of a record including dimension values such as dimension values 550 returned from a vector database. Dimension values 610 describe a historical fault which is deemed, by virtue of a multi-dimensional vector representing dimension values 610, to be most-similar to the fault represented by dimension values 510. Dimension values 620 describe actions corresponding to (i.e., executed to address) the fault of dimension values 610. Any suitable dimensions may be used to represent actions according to some embodiments.

Returning to process 200, it is determined at S230 whether or not to automatically execute the identified actions. The determination at S230 may be based on any suitable factors. In some embodiments, it is determined to automatically execute the identified actions if a degree of similarity between the vector generated at S215 and the stored vector determined at S220 is greater than a first threshold. Additionally, or alternatively, the determination at S230 may be based on whether or not a degree of confidence associated with the actions is greater than a second threshold. In the latter regard, each stored record such as that shown in FIG. 6 may include a value indicating a degree of confidence that the described actions will resolve the described fault. The value may be incremented each time the actions are used to address the fault.

If it is determined at S230 to automatically execute the identified actions, the actions are automatically executed at S235. The actions may be performed by the component (e.g., application 112) which executes process 200 and/or by other software applications which are instructed to perform one or more of the actions by the component which executes process 200. Such instructions may comprise API calls to the other applications. Next, at S240, a confirmation of the executed actions is presented. The confirmation may be presented on a user device, and may also include an indication that the fault has been resolved.

If the determination at S230 is negative, flow proceeds to S246 to present the actions. Presentation of the actions may include the display of links which may be selected to facilitate performance of the actions. The links may, for example, be selectable to access one or more applications which are usable to execute the actions. In some embodiments, a displayed link may invoke a macro to cause performance of one or more of the actions.

Figure 7:
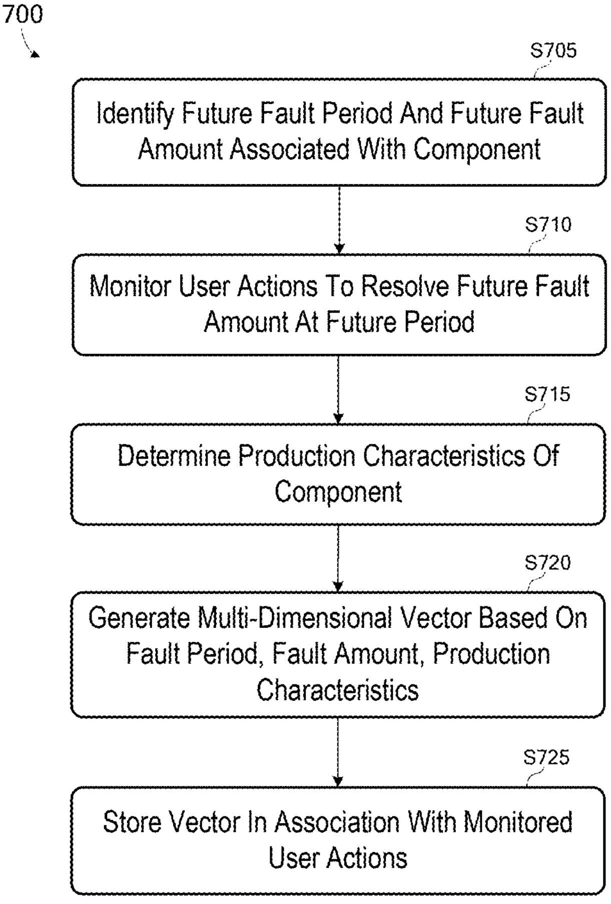
FIG. 7 is a flow diagram of a process to populate a vector database according to some embodiments.

FIG. 7 is a flow diagram of process 700 to populate a vector database such as vector database 150 according to some embodiments. Process 700 may be executed before process 200 in order to populate a vector database used in process 200, and also in parallel with process 200 in order to continue populating the vector database with new data during executions of process 200.

A future fault period and future fault amount associated with a component is determined at S705. S705 may proceed as described above with respect to S205. Next, at S710, user actions to resolve the future fault amount at the future period are monitored. The user actions may comprise operating one or more applications to resolve the fault. Monitoring the user actions may comprise recording the one or more applications, user inputs to the application, data updates caused by the user inputs, etc.

Production characteristics of the component are determined at S715 as described above with respect to S210, and a multi-dimensional vector is generated based on the fault period, the fault amount and the production characteristics at S720 as described with respect to S215. The vector is then stored in a vector database at S725 in association with data representing the monitored user actions.

Figure 8:
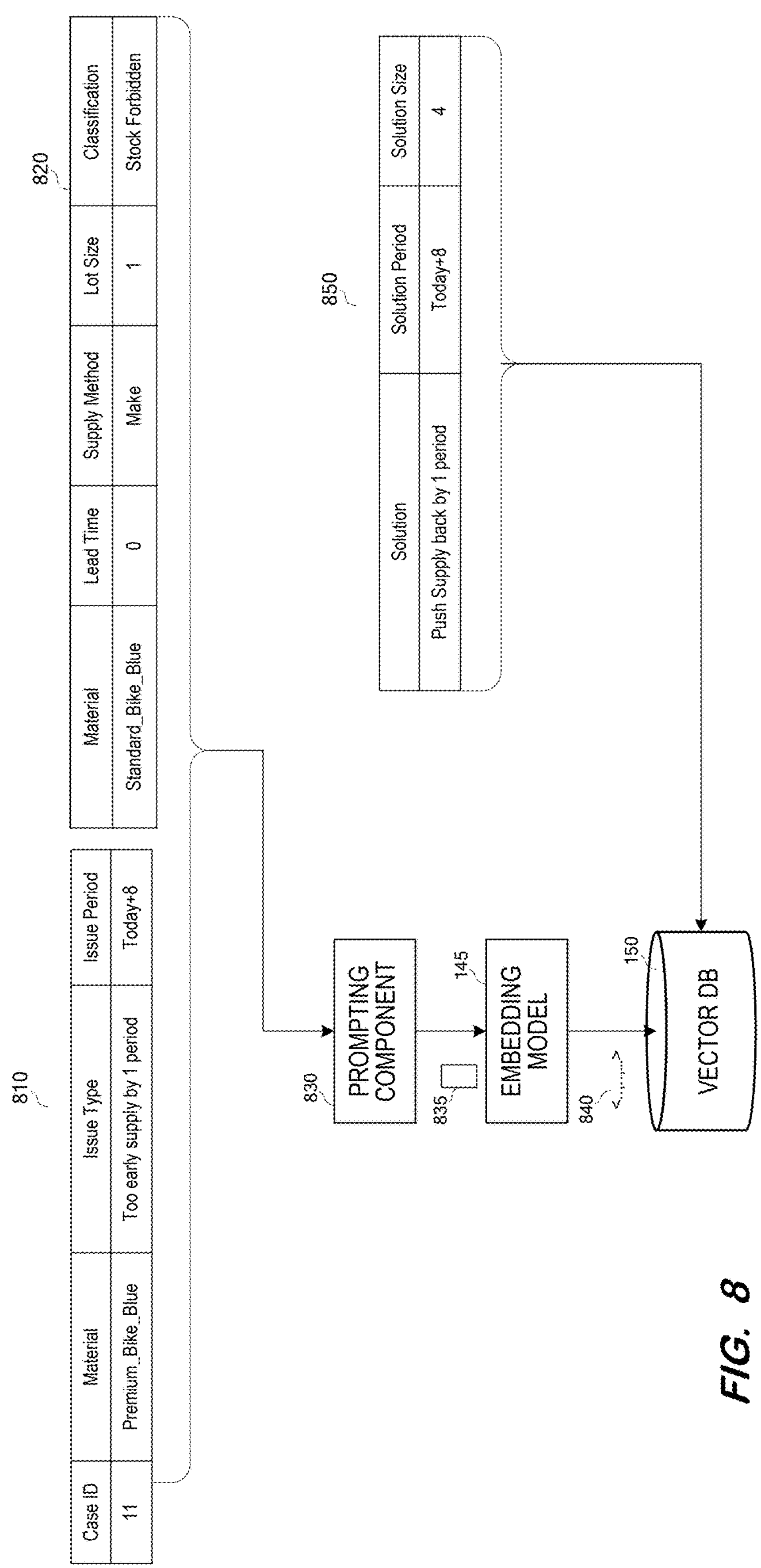
FIG. 8 illustrates populating a vector database according to some embodiments.

FIG. 8 illustrates populating a vector database according to some embodiments of process 700. As shown, dimension values 810 describe a fault period and a component, and dimension values 820 describe production characteristics of the component. Prompting component 830 generates prompt 835 based on dimension values 810 and dimension values 820. Prompting component 830 may use the same prompt template as used at S215 of process 200. Embedding model 145 generates multi-dimensional vector 840 based on prompt 835.

Dimension values 850 represent user actions which were executed to resolve the fault described by dimension values 810. Vector 840 is stored in vector database 150 in association with dimension values 850. This association allows retrieval of dimension values 850 if vector 840 is determined to be similar to the generated vector at S220.

Figure 9:
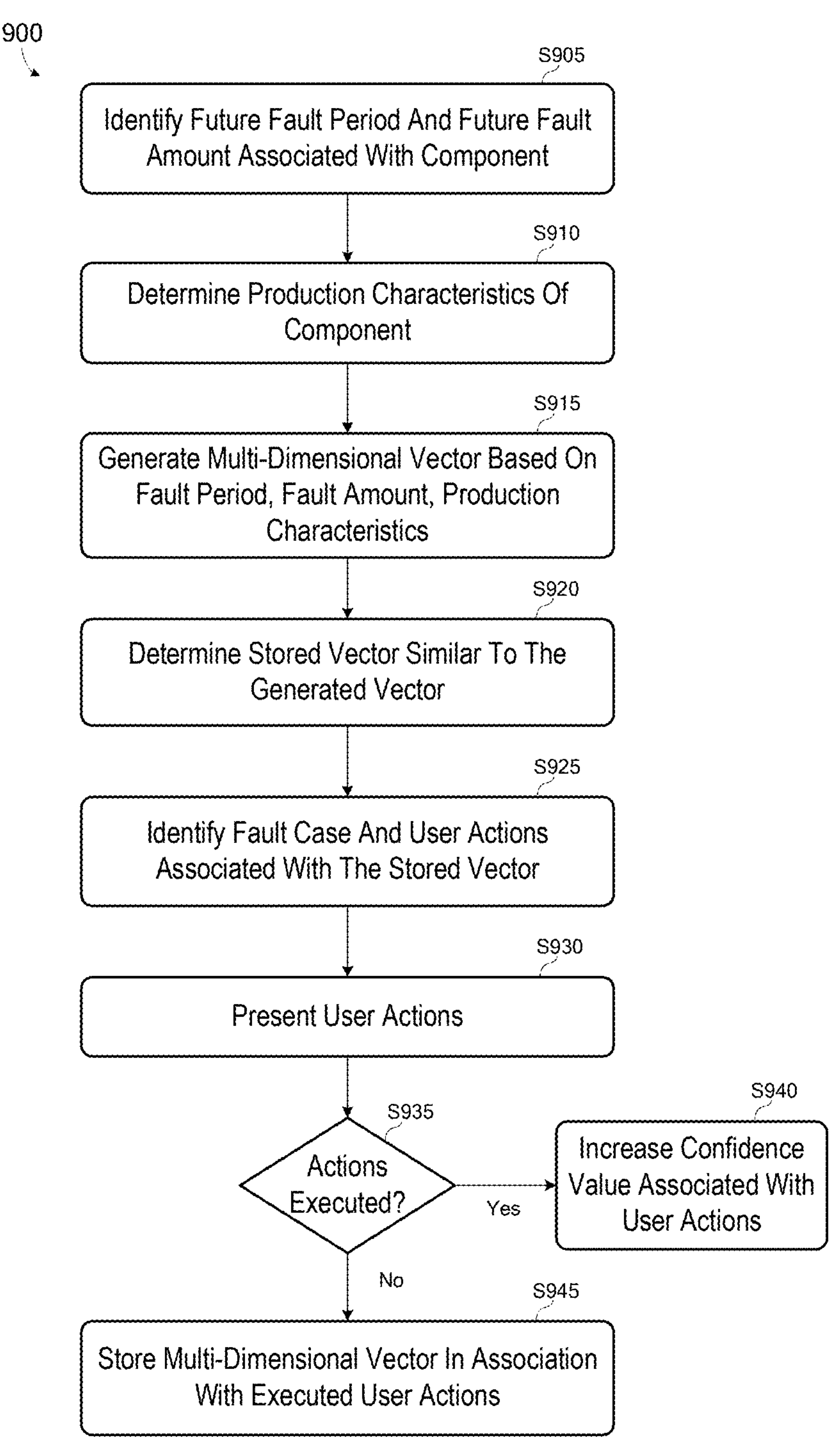
FIG. 9 is a flow diagram of a process to identify and resolve potential faults within an enterprise system according to some embodiments.

FIG. 9 is a flow diagram of process 900 according to some embodiments. S905 through S925 may proceed as described above with respect to S205 through S225. The user actions identified at S925 are presented at S830. Next, at S935, user inputs are monitored to determine whether the presented user actions are executed to resolve the fault. If so, the vector database is updated at S940 to increase a confidence value of the user actions associated with the stored vector determined at S920. This positive feedback may be leveraged as described above to determine whether the user actions are appropriate for resolution (either automatic or otherwise) of a newly-determined fault.

Flow proceeds to S945 if actions other than the presented user actions are executed to resolve the fault. The other actions may include one or more actions in addition to the presented user actions, one or more actions which substitute for one or more of the presented actions, a subset of the presented user actions, etc. At S940, the vector generated at S915 is stored in the vector database in association with data representing the actually-executed actions. The vector and its associated data thereby becomes a new fault case within the vector database which may be identified as similar to subsequently-identified faults as described herein.

Figure 10:
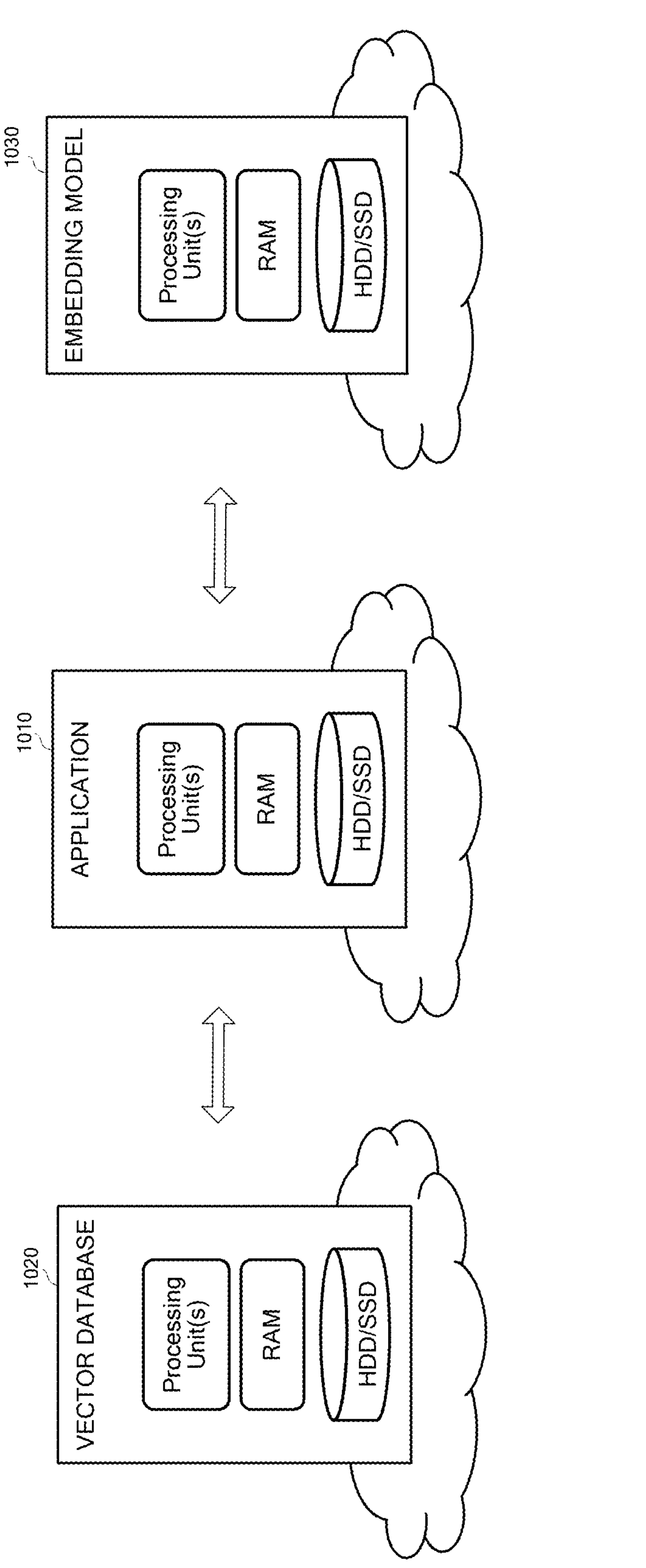
FIG. 10 is a diagram of a cloud-based implementation according to some embodiments.

FIG. 10 is a diagram of a cloud-based implementation according to some embodiments. Application 1010 may provide fault detection as described herein. Vector database 1020 may store embeddings and associated data representing user actions. Embedding model 1030 may be prompted by application 110 to generate embeddings representing fault cases. Each of systems 1010 through 1030 may comprise cloud-based resources residing in one or more public clouds providing self-service and immediate provisioning, autoscaling, security, compliance and identity management features. Each of systems 1010 through 1040 may comprise servers or virtual machines of respective Kubernetes clusters, but embodiments are not limited thereto.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software components suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable recording media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:

a memory storing program code; and at least one processing unit to execute the program code to cause the system to:

identify a fault comprising a fault period and a fault amount associated with a component, the fault amount comprising a shortage in a supply of the component;

transmit a prompt to an embedding model, the prompt comprising dimensional values representing the fault;

receive, from the embedding model, a multi-dimensional vector for the fault, the multi-dimensional vector representing the fault period and the fault amount;

search a vector database of multi-dimensional vectors, calculate a measurement of similarity between the multi-dimensional vector and a plurality of candidate multi-dimensional vectors of the vector database, and identify a second multi-dimensional vector of the plurality of candidate multi-dimensional vectors similar to the first multi-dimensional vector, based on the measurement of similarity, and identify first user actions corresponding to the second multi-dimensional vector;

present the first user actions to a user on a user interface;

in response to resolution of the fault period, detect a plurality of second user actions associated with the resolution of the fault period and the fault amount associated with the component; and store a record in the vector database associating the multi-dimensional vector with data representing the plurality of second user actions.

2. The system of claim 1, wherein generation of the multi-dimensional vector comprises:

generation of text comprising the fault period, the fault amount, and the component; and input of the text to an embedding model.

3. The system of claim 1, wherein storage of the record in the vector database comprises:

determination that the plurality of user actions are different from the first user actions; and storage of the record in the vector database in response to the determination that the plurality of user actions are different from the first user actions.

4. The system of claim 1, the at least one processing unit to execute the program code to cause the system to:

identify a second fault period and a second fault amount associated with the first component;

generate a third multi-dimensional vector representing the second fault period and the second fault amount;

search the vector database of multi-dimensional vectors to identify the second multi-dimensional vector as similar to the third multi-dimensional vector and the first user actions corresponding to the second multi-dimensional vector;

present the first user actions;

detect a second plurality of user actions associated with resolution of the second fault period and the second fault amount associated with the component;

determine that the second plurality of user actions are similar to the first user actions; and in response to the determination that the second plurality of user actions are similar to the first user actions, do not store a record in the vector database associating the third multi-dimensional vector with data representing the second plurality of user actions.

5. The system of claim 1, the at least one processing unit to execute the program code to cause the system to:

identify a second fault period and a second fault amount associated with a second component;

generate a third multi-dimensional vector representing the second fault period and the second fault amount;

search the vector database of multi-dimensional vectors to identify a fourth multi-dimensional vector as similar to the third multi-dimensional vector and second user actions corresponding to the fourth multi-dimensional vector;

present the second user actions;

detect a second plurality of user actions associated with resolution of the second fault period and the second fault amount associated with the second component;

determine that the second plurality of user actions are different from the second user actions; and in response to the determination that the second plurality of user actions are different from the second user actions, store a second record in the vector database associating the third multi-dimensional vector with data representing the second plurality of user actions.

6. The system of claim 5, wherein generation of the multi-dimensional vector comprises:

generation of text comprising the fault period, the fault amount and the component;

input of the text to an embedding model, and wherein generation of the third multi-dimensional vector comprises:

generation of second text comprising the second fault period, the second fault amount, and the second component; and input of the second text to the embedding model.

7. A method comprising:

identifying a fault comprising a fault period and a fault amount associated with a component, the fault amount comprising a shortage in a supply of the component;

transmitting a prompt to an embedding model, the prompt comprising dimensional values representing the fault;

receiving, from the embedding model, a multi-dimensional vector for the fault, the multi-dimensional vector representing the fault period and the fault amount;

searching a vector database of multi-dimensional vectors, calculating a measurement of similarity between the multi-dimensional vector and a plurality of candidate multi-dimensional vectors of the vector database, and identifying a second multi-dimensional vector of the plurality of candidate multi-dimensional vectors similar to the first multi-dimensional vector, based on the measurement of similarity, and identifying first actions corresponding to the second multi-dimensional vector;

presenting the first user actions to a user on a user interface; and automatically executing the first actions to resolve the fault period and the fault amount associated with the component.

8. The method of claim 7, wherein generating the multi-dimensional vector comprises:

generating text comprising the fault period, the fault amount, and the component; and inputting the text to an embedding model.

9. The method of claim 7, wherein automatically executing the first actions comprises:

determining that a similarity between the first multi-dimensional vector and the second multi-dimensional vector is greater than a threshold; and automatically executing the first actions in response to determining that the similarity between the first multi-dimensional vector and the second multi-dimensional vector is greater than the threshold.

10. The method of claim 9, further comprising:

identifying a second fault period and a second fault amount associated with the first component;

generating a third multi-dimensional vector representing the second fault period and the second fault amount;

searching the vector database of multi-dimensional vectors to identify the second multi-dimensional vector as similar to the third multi-dimensional vector and the first user actions corresponding to the second multi-dimensional vector;

determining that a similarity between the third multi-dimensional vector and the second multi-dimensional vector is less than a threshold;

in response to determining that the similarity between the third multi-dimensional vector and the second multi-dimensional vector is less than the threshold, presenting the first user actions;

detecting a second plurality of user actions associated with resolution of the second fault period and the second fault amount associated with the component;

determining that the second plurality of user actions are not similar to the first actions; and in response to the determination that the second plurality of user actions are not similar to the first actions, storing a record in the vector database associating the third multi-dimensional vector with data representing the second plurality of user actions.

11. The method of claim 7, further comprising:

identifying a second fault period and a second fault amount associated with the first component;

generating a third multi-dimensional vector representing the second fault period and the second fault amount;

searching the vector database of multi-dimensional vectors to identify the second multi-dimensional vector as similar to the third multi-dimensional vector and the first actions corresponding to the second multi-dimensional vector;

presenting the first actions;

detecting a second plurality of user actions associated with resolution of the second fault period and the second fault amount associated with the component;

determining that the second plurality of user actions are not similar to the first actions; and in response to the determination that the second plurality of user actions are not similar to the first actions, storing a record in the vector database associating the third multi-dimensional vector with data representing the second plurality of user actions.

12. The method of claim 7, further comprising:

identifying a second fault period and a second fault amount associated with a second component;

generating a third multi-dimensional vector representing the second fault period and the second fault amount;

searching the vector database of multi-dimensional vectors to identify a fourth multi-dimensional vector as similar to the third multi-dimensional vector and second actions corresponding to the fourth multi-dimensional vector;

automatically executing the second actions to resolve the fault period and the fault amount associated with the component.

13. The method of claim 12, wherein generating the multi-dimensional vector comprises:

generating text comprising the fault period, the fault amount, and the component;

inputting the text to an embedding model, and wherein generating the third multi-dimensional vector comprises:

generating second text comprising the second fault period, the second fault amount, and the second component; and inputting the second text to the embedding model.

14. One or more non-transitory computer-readable recording media storing program code, the program code executable by at least one processing unit of a computing system to:

identify a fault comprising a fault period and a fault amount associated with a component, the fault amount comprising a shortage in a supply of the component;

transmit a prompt to an embedding model, the prompt comprising dimensional values representing the fault;

receive, from the embedding model, a multi-dimensional vector for the fault, the multi-dimensional vector representing the fault period and the fault amount;

search a vector database of multi-dimensional vectors, calculate a measurement of similarity between the multi-dimensional vector and a plurality of candidate multi-dimensional vectors of the vector database, and identify a second multi-dimensional vector of the plurality of candidate multi-dimensional vectors similar to the first multi-dimensional vector, based on the measurement of similarity, and identify first user actions corresponding to the second multi-dimensional vector;

present the first user actions to a user on a user interface;

in response to resolution of the fault period, detect a plurality of second user actions associated with the resolution of the fault period and the fault amount associated with the component; and store a record in the vector database associating the multi-dimensional vector with data representing the plurality of second user actions.

15. The one or more non-transitory computer-readable recording media of claim 14, wherein generation of the multi-dimensional vector comprises:

generation of text comprising the fault period, the fault amount, and the component; and input of the text to an embedding model.

16. The one or more non-transitory computer-readable recording media of claim 14, wherein storage of the record in the vector database comprises:

determination that the plurality of user actions are different from the first user actions; and storage of the record in the vector database in response to the determination that the plurality of user actions are different from the first user actions.

17. The one or more non-transitory computer-readable recording media of claim 14, the program code executable by at least one processing unit of a computing system to:

identify a second fault period and a second fault amount associated with a second component;

generate a third multi-dimensional vector representing the second fault period and the second fault amount;

search the vector database of multi-dimensional vectors to identify a fourth multi-dimensional vector as similar to the third multi-dimensional vector and second user actions corresponding to the fourth multi-dimensional vector;

present the second user actions;

detect a second plurality of user actions associated with resolution of the second fault period and the second fault amount associated with the second component;

determine that the second plurality of user actions are different from the second user actions; and in response to the determination that the second plurality of user actions are different from the second user actions, store a second record in the vector database associating the third multi-dimensional vector with data representing the second plurality of user actions.

* * * * *